US012148555B2

(12) United States Patent
Yashiki et al.

(10) Patent No.: US 12,148,555 B2
(45) Date of Patent: Nov. 19, 2024

(54) NON-ORIENTED ELECTRICAL STEEL SHEET

(71) Applicant: NIPPON STEEL CORPORATION, Tokyo (JP)

(72) Inventors: Hiroyoshi Yashiki, Tokyo (JP); Yoshiaki Natori, Tokyo (JP); Miho Tomita, Tokyo (JP); Kazutoshi Takeda, Tokyo (JP); Takuya Matsumoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 691 days.

(21) Appl. No.: 17/259,837

(22) PCT Filed: Nov. 1, 2019

(86) PCT No.: PCT/JP2019/043021
§ 371 (c)(1),
(2) Date: Jan. 12, 2021

(87) PCT Pub. No.: WO2020/091039
PCT Pub. Date: May 7, 2020

(65) Prior Publication Data

US 2021/0343458 A1 Nov. 4, 2021

(30) Foreign Application Priority Data

Nov. 2, 2018 (JP) ................................ 2018-206970

(51) Int. Cl.

| | |
|---|---|
| ***H01F 1/147*** | (2006.01) |
| ***C21D 6/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/16*** | (2006.01) |
| ***C22C 38/60*** | (2006.01) |

(52) U.S. Cl.
CPC ............. *H01F 1/147* (2013.01); *C21D 6/008* (2013.01); *C21D 8/1222* (2013.01); *C21D 8/1233* (2013.01); *C21D 8/1261* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 9,570,219 B2 | 2/2017 | Natori et al. | |
| 2006/0124207 A1 | 6/2006 | Takashima et al. | |
| 2010/0158744 A1* | 6/2010 | Murakami | C22C 38/08 420/83 |
| 2011/0073223 A1 | 3/2011 | Sohn et al. | |
| 2012/0321502 A1* | 12/2012 | Shimazu | C22C 38/22 420/83 |
| 2013/0306200 A1* | 11/2013 | Kohno | C21D 8/1266 148/330 |
| 2015/0187475 A1* | 7/2015 | Zaizen | C22C 38/60 148/309 |
| 2017/0274432 A1* | 9/2017 | Okubo | C22C 38/12 |
| 2019/0189318 A1 | 6/2019 | Uesaka et al. | |
| 2020/0040423 A1 | 2/2020 | Natori et al. | |

FOREIGN PATENT DOCUMENTS

| | | | | |
|---|---|---|---|---|
| JP | 2003-105508 A | | 4/2003 | |
| JP | 2004-300535 A | | 10/2004 | |
| JP | 2007-186791 A | | 7/2007 | |
| JP | 2010-90474 A | | 4/2010 | |
| JP | 2011/084761 | * | 4/2011 | C21D 8/12 |
| JP | 2011/246810 | * | 12/2011 | B21B 3/02 |
| JP | 2011-246810 A | | 12/2011 | |
| JP | 2012/140676 | * | 7/2012 | C21D 8/12 |
| JP | 2012-140676 A | | 7/2012 | |
| JP | 2018-21242 A | | 2/2018 | |
| TW | 201726944 A | | 8/2017 | |
| WO | WO 2019/017426 A1 | | 1/2019 | |

OTHER PUBLICATIONS

Bahrim—aluminum soluble-insoble portions in steel—2011 (Year: 2011).*
Oda—JP 2011-246810 A—PCT D1 + IDS—MT—nonoriented steel sheet—2011 (Year: 2011).*
Tanaka—JP 2011-084761 A—MT—steel composition—2011 (Year: 2011).*
Kono—JP 2012-140676 A—IDS—MT—non-oriented steel sheet—insulating coating w-motivation—2012 (Year: 2012).*
"Metallic materials—Tensile testing—Method of test at room temperature", JIS Z 2241, 2011, total 37 pages.

(Continued)

*Primary Examiner* — John Vincent Lawler
(74) *Attorney, Agent, or Firm* — Birch, Stewart, Kolasch & Birch, LLP

(57) ABSTRACT

This non-oriented electrical steel sheet includes a base metal having a predetermined chemical composition satisfying the expression [Si+sol. Al+0.5×Mn≥4.3], and an average grain size of the base metal is more than 40 μm and 120 μm or less.

8 Claims, No Drawings

(56) References Cited

OTHER PUBLICATIONS

"Test methods for electrical steel strip and sheet—Part 1: Methods of measurement of the magnetic properties of electrical steel strip and sheet by means of an Epstein frame", JIS C 2550-1, 2011, total 22 pages.
U.S. Appl. No. 18/284,765, filed Sep. 28, 2023.

* cited by examiner

NON-ORIENTED ELECTRICAL STEEL SHEET

TECHNICAL FIELD OF THE INVENTION

The present invention relates to a non-oriented electrical steel sheet.

Priority is claimed on Japanese Patent Application No. 2018-206970, filed Nov. 2, 2018, the content of which is incorporated herein by reference.

RELATED ART

In recent years, global environmental problems have been attracting attention, there is an increasing demand for energy saving efforts. Among the demands for energy saving efforts, there is a strong demand for higher efficiency of electrical devices. For this reason, even in non-oriented electrical steel sheets that are widely used as core materials for motors, generators, and the like, there is an increasing demand for an improvement in magnetic characteristics. This tendency is significant in drive motors for electric vehicles and hybrid vehicles and compressor motors for air conditioners.

The motor core of various motors as described above is constituted by a stator which is a stator and a rotor which is a rotor. The characteristics required for the stator and rotor that constitute the motor core are different from each other. The stator is required to have excellent magnetic characteristics (low iron loss and high magnetic flux density), particularly low iron loss, while the rotor is required to have excellent mechanical properties (high strength).

Since the characteristics required for the stator and the rotor are different, the desired characteristics can be realized by separately producing a non-oriented electrical steel sheet for the stator and a non-oriented electrical steel sheet for the rotor. However, preparing two kinds of non-oriented electrical steel sheets causes a decrease in yield. Therefore, in order to realize the low iron loss required for the stator without performing stress relieving annealing while realizing the high strength required for the rotor, a non-oriented electrical steel sheet having excellent strength and excellent magnetic characteristics has been hitherto examined.

For example, in Patent Documents 1 to 3, attempts have been made to realize excellent magnetic characteristics and high strength. Further, in Patent Document 4, an attempt has been made to realize excellent magnetic characteristics and high strength, and to further reduce variation in characteristics.

PRIOR ART DOCUMENT

Patent Document

[Patent Document 1] Japanese Unexamined Patent Application, First Publication No. 2004-300535

[Patent Document 2] Japanese Unexamined Patent Application, First Publication No. 2007-186791

[Patent Document 3] Japanese Unexamined Patent Application, First Publication No. 2012-140676

[Patent Document 4] Japanese Unexamined Patent Application, First Publication No. 2010-90474

DISCLOSURE OF THE INVENTION

Problems to be Solved by the Invention

However, in recent years, in order to realize the energy-saving characteristics required for motors of electric vehicles or hybrid vehicles, the technologies disclosed in Patent Documents 1 to 3 are insufficient to achieve low iron loss as a stator material. In addition, in Patent Document 4, since recrystallized grains are made finer by performing final annealing in a low temperature region, hysteresis loss becomes large, and as in Patent Documents 1 to 3, there is a problem in that a reduction in iron loss is insufficient as a stator material.

The present invention has been made to solve such a problem, and an object thereof is to provide a non-oriented electrical steel sheet having high strength and excellent magnetic characteristics.

Means for Solving the Problem

The gist of the present invention is the following non-oriented electrical steel sheet.

(1) A non-oriented electrical steel sheet according to an aspect of the present invention includes: a base metal containing, as a chemical composition, by mass %,
C: 0.0050% or less,
Si: more than 3.7% and 5.0% or less,
Mn: more than 0.2% and 1.5% or less,
sol. Al: 0.05% to 0.45%,
P: 0.030% or less,
S: 0.0030% or less,
N: 0.0030% or less,
Ti: less than 0.0050%,
Nb: less than 0.0050%,
Zr: less than 0.0050%,
V: less than 0.0050%,
Cu: less than 0.200%,
Ni: less than 0.500%,
Sn: 0 to 0.100%,
Sb: 0 to 0.100%, and
a remainder: Fe and impurities,
in which Expression (i) is satisfied, and
the average grain size of the base metal is more than 40 μm and 120 μm or less, $$\mathrm{Si}+\mathrm{sol.\ Al}+0.5\times\mathrm{Mn}\geq 4.3 \quad \text{(i)}$$

where element symbols in the expression represent amounts of respective elements in mass %.

(2) In the non-oriented electrical steel sheet according to (1), the tensile strength of the non-oriented electrical steel sheet may be 600 MPa or more.

(3) In the non-oriented electrical steel sheet according to (1) or (2), the chemical composition may include, by mass %, one or two selected from the group consisting of
Sn: 0.005% to 0.100%, and
Sb: 0.005% to 0.100%.

(4) The non-oriented electrical steel sheet according to any one of (1) to (3) may further include: an insulation coating on a surface of the base metal.

Effects of the Invention

According to the above aspect according to the present invention, a non-oriented electrical steel sheet having high strength and excellent magnetic characteristics can be obtained.

EMBODIMENTS OF THE INVENTION

The present inventors conducted intensive studies to solve the above problems, and as a result, obtained the following findings.

Si, Mn, and Al are elements having an effect of increasing the electric resistance of steel and reducing eddy-current loss. These elements are elements that also contribute to high-strengthening of steel.

Among Si, Mn, and Al, Si is an element that most efficiently contributes to an increase in electric resistance. Like Si, Al also has the effect of efficiently increasing the electric resistance. On the other hand, Mn has a slightly lower effect of increasing the electrical resistance than Si and Al.

From these facts, in the present embodiment, by adjusting the amounts of Si, Al, and Mn within appropriate ranges, high-strengthening and an improvement in magnetic characteristics can be achieved.

Furthermore, in the present embodiment, it is also important to control the grain size in order to achieve the high-strengthening and the improvement in the magnetic characteristics. From the viewpoint of high-strengthening, it is desirable that the grains in the steel are fine grains.

Furthermore, in order to improve the magnetic characteristics of the non-oriented electrical steel sheet, it is necessary to improve high-frequency iron loss. Iron loss mainly consists of hysteresis loss and eddy-current loss. Here, in order to reduce the hysteresis loss, it is preferable to make the grains coarser, and in order to reduce the eddy-current loss, it is preferable to make the grains finer. That is, there is a trade-off relationship between the two.

Therefore, as a result of further studies, the present inventors found that there is a suitable grain size range for achieving high-strengthening and an improvement in the magnetic characteristics.

The present invention has been made based on the above findings. Hereinafter, a preferred embodiment of the present invention will be described in detail. However, the present invention is not limited to the configuration disclosed in the present embodiment, and various modifications can be made without departing from the spirit of the present invention.

1. Overall Configuration

A non-oriented electrical steel sheet according to the present embodiment has high strength and excellent magnetic characteristics, and is therefore suitable for both a stator and a rotor. In addition, the non-oriented electrical steel sheet according to the present embodiment preferably includes an insulation coating on the surface of a base metal described below.

2. Chemical Composition of Base Metal

The reasons for limiting each element in the chemical composition of the base metal of the non-oriented electrical steel sheet according to the present embodiment are as follows. In the following description, "%" for the content means "mass %". A numerical limit range described with "to" includes the lower limit and the upper limit in the range.

C: 0.0050% or Less

C (carbon) is an element that causes iron loss deterioration of the non-oriented electrical steel sheet. When the C content exceeds 0.0050%, the iron loss of the non-oriented electrical steel sheet deteriorates, and good magnetic characteristics cannot be obtained. Therefore, the C content is set to 0.0050% or less. The C content is preferably 0.0040% or less, more preferably 0.0035% or less, and even more preferably 0.0030% or less. Since C contributes to high-strengthening of the non-oriented electrical steel sheet, in a case where the effect is to be obtained, the C content is preferably 0.0005% or more, and preferably 0.0010% or more.

Si: More than 3.7% and 5.0% or Less

Si (silicon) is an element that increases the electric resistance of steel, reduces eddy-current loss, and improves high-frequency iron loss of the non-oriented electrical steel sheet. In addition, Si has a large solid solution strengthening ability and is thus an element effective for the high-strengthening of the non-oriented electrical steel sheet. In order to obtain these effects, the Si content is set to more than 3.7%. The Si content is preferably 3.8% or more, more preferably 3.9% or more, and even more preferably more than 4.0%. On the other hand, when the Si content is excessive, the workability is significantly deteriorated, and it becomes difficult to perform cold rolling. Therefore, the Si content is set to 5.0% or less. The Si content is preferably 4.8% or less, and more preferably 4.5% or less.

Mn: More than 0.2% and 1.5% or Less

Mn (manganese) is an element effective for increasing the electric resistance of steel, reducing the eddy-current loss, and improving the high-frequency iron loss of the non-oriented electrical steel sheet. In a case where the Mn content is too low, the effect of increasing the electric resistance is small, and fine sulfides (MnS) precipitate in steel, so that there are cases where grains do not sufficiently grow during final annealing. Therefore, the Mn content is set to more than 0.2%. The Mn content is preferably 0.3% or more, and more preferably 0.4% or more. On the other hand, when the Mn content is excessive, a decrease in the magnetic flux density of the non-oriented electrical steel sheet becomes significant. Therefore, the Mn content is set to 1.5% or less. The Mn content is preferably 1.4% or less, and more preferably 1.2% or less.

Sol. Al: 0.05% to 0.45%

Al (aluminum) is an element that has an effect of increasing the electric resistance of steel, reducing the eddy-current loss, and improving the high-frequency iron loss of the non-oriented electrical steel sheet. In addition, Al is an element that contributes to the high-strengthening of the non-oriented electrical steel sheet by solid solution strengthening, though not as much as Si. In order to obtain these effects, the sol. Al content is set to 0.05% or more. The sol. Al content is preferably 0.10% or less, and more preferably 0.15% or less. On the other hand, when the sol. Al content is excessive, a decrease in the magnetic flux density of the non-oriented electrical steel sheet becomes significant. Therefore, the sol. Al content is set to 0.45% or less. The sol. Al content is preferably 0.40% or less, more preferably 0.35% or less, and even more preferably 0.30% or less. In the present embodiment, the sol. Al content means the amount of sol. Al (acid-soluble Al).

In the present embodiment, the electric resistance of the steel is secured by appropriately controlling the Si, Al, and Mn contents. In addition, from the viewpoint of securing strength, it is necessary to appropriately control the Si, Al, and Mn contents. Therefore, in addition to the Si, Al, and Mn contents being within the above ranges, it is necessary to satisfy Expression (i). The value on the left side of Expression (i) is preferably 4.4 or more, and more preferably 4.5 or more.

$$Si+sol.\ Al+0.5\times Mn\geq 4.3 \quad (i)$$

where element symbols in the expression represent amounts of respective elements in mass %.

P: 0.030% or Less

P (phosphorus) is contained in steel as an impurity. When the P content is excessive, the ductility of the non-oriented electrical steel sheet is significantly deteriorated. Therefore, the P content is set to 0.030% or less. The P content is preferably 0.025% or less, and more preferably 0.020% or less. The P content is preferably 0%, but the P content may be set to 0.003% or more because an excessive reduction in the P content may cause an increase in manufacturing cost.

S: 0.0030% or Less

S (sulfur) is an element that increases iron loss by forming fine precipitates of MnS and deteriorates the magnetic characteristics of the non-oriented electrical steel sheet. Therefore, the S content is set to 0.0030% or less. The S content is preferably 0.0020% or less, and more preferably 0.0015% or less. Since an excessive reduction in the S content may cause an increase in manufacturing cost, the S content is preferably 0.0001% or more, more preferably 0.0003% or more, and even more preferably 0.0005% or more.

N: 0.0030% or Less

N (nitrogen) is an element that is unavoidably incorporated in steel, and is an element that forms a nitride, increases iron loss, and deteriorates the magnetic characteristics of the non-oriented electrical steel sheet. Therefore, the N content is set to 0.0030% or less. The N content is preferably 0.0025% or less, and more preferably 0.0020% or less. There are cases where an excessive reduction in the N content leads to an increase in manufacturing cost. Therefore, the N content is preferably set to 0.0005% or more.

Ti: Less than 0.0050%

Ti (titanium) is an element that is unavoidably incorporated in steel and can be bonded to carbon or nitrogen to form precipitates (carbides or nitrides). In a case where carbides or nitrides are formed, these precipitates themselves deteriorate the magnetic characteristics of the non-oriented electrical steel sheet. Furthermore, the formation of carbides or nitrides inhibits the growth of grains during final annealing and deteriorates the magnetic characteristics of the non-oriented electrical steel sheet. Therefore, the Ti content is set to less than 0.0050%. The Ti content is preferably 0.0040% or less, more preferably 0.0030% or less, and even more preferably 0.0020% or less. There are cases where an excessive reduction in the Ti content leads to an increase in manufacturing cost. Therefore, the Ti content is preferably 0.0005% or more.

Nb: Less than 0.0050%

Nb (niobium) is an element that contributes to high-strengthening by being bonded to carbon or nitrogen and forming precipitates (carbides). However, these precipitates themselves deteriorate the magnetic characteristics of the non-oriented electrical steel sheet. Therefore, the Nb content is set to less than 0.0050%. The Nb content is preferably 0.0040% or less, more preferably 0.0030% or less, and even more preferably 0.0020% or less. In addition, the Nb content is more preferably not more than the measurement limit, and more preferably less than 0.0001%. Since the lower the Nb content is, the more preferable it is, the Nb content may be 0%.

Zr: Less than 0.0050%

Zr (zirconium) is an element that contributes to high-strengthening by being bonded to carbon or nitrogen and forming precipitates (carbides or nitrides). However, these precipitates themselves deteriorate the magnetic characteristics of the non-oriented electrical steel sheet. Therefore, the Zr content is set to less than 0.0050%. The Zr content is preferably 0.0040% or less, more preferably 0.0030% or less, and even more preferably 0.0020% or less. Furthermore, the Zr content is more preferably not more than the measurement limit, and more preferably 0.0001% or less. Since the lower the Zr content is, the more preferable it is, the Zr content may be 0%.

V: Less than 0.0050%

V (vanadium) is an element that contributes to high-strengthening by being bonded to carbon or nitrogen and forming precipitates (carbides or nitrides). However, these precipitates themselves deteriorate the magnetic characteristics of the non-oriented electrical steel sheet. Therefore, the V content is set to less than 0.0050%. The V content is preferably 0.0040% or less, more preferably 0.0030% or less, and even more preferably 0.0020% or less. The V content is more preferably not more than the measurement limit, and more preferably 0.0001% or less. Since the lower the V content is, the more preferable it is, the V content may be 0%.

Cu: Less than 0.200%

Cu (copper) is an element that is unavoidably incorporated in steel. When Cu is intentionally contained, the manufacturing cost of the non-oriented electrical steel sheet increases. Therefore, in the present embodiment, Cu does not need to be positively contained, and may be at an impurity level. The Cu content is set to less than 0.200%, which is the maximum value that can be unavoidably incorporated in the manufacturing process. The Cu content is preferably 0.150% or less, and more preferably 0.100% or less. The lower limit of the Cu content is not particularly limited, but an excessive reduction in the Cu content may cause an increase in manufacturing cost. Therefore, the Cu content is preferably 0.001% or more, more preferably 0.003% or more, and even more preferably 0.005% or more.

Ni: Less than 0.500%

Ni (nickel) is an element that is unavoidably incorporated in steel. However, since Ni is also an element that improves the strength of the non-oriented electrical steel sheet, it may be intentionally contained. However, since Ni is expensive, the Ni content is set to less than 0.500%. The Ni content is preferably 0.400% or less, and more preferably 0.300% or less. The lower limit of the Ni content is not particularly limited, but an excessive reduction in the Ni content may cause an increase in manufacturing cost. Therefore, the Ni content is preferably 0.001% or more, more preferably 0.003% or more, and even more preferably 0.005% or more.

Sn: 0% to 0.100%

Sb: 0% to 0.100%

Sn (tin) and Sb (antimony) are elements useful for securing low iron loss in the non-oriented electrical steel sheets by segregating on the surface of the base metal and suppressing oxidation and nitriding during annealing. In addition, Sn and Sb also have an effect of increasing the magnetic flux density of the non-oriented electrical steel sheet by segregating at the grain boundaries and improving the texture. Therefore, Sn or Sb or combination thereof may be contained if necessary. However, when the amounts of these elements are excessive, there are cases where the toughness of the steel decreases, and it is difficult to perform cold rolling. Therefore, the amount of each of Sn and Sb is set to 0.100% or less. The amount of each of Sn and Sb is preferably 0.060% or less. In a case where the above effect is to be reliably obtained, the amount of Sn or Sb or combination thereof is set to preferably 0.005% or more, and more preferably 0.010% or more.

In the chemical composition of the base metal of the non-oriented electrical steel sheet according to the present embodiment, the remainder consists of Fe and impurities. Here, the "impurities" are elements that are incorporated in due to various factors in a manufacturing process, including raw materials such as ores and scraps, when steel is industrially manufactured, and are allowed in a range in which the impurities do not have an adverse effect on the characteristics of the non-oriented electrical steel sheet according to the present embodiment.

The amounts of Cr and Mo as impurity elements are not particularly specified. In the non-oriented electrical steel sheet according to the present embodiment, even if each of these elements is contained in a range of 0.5% or less, the characteristics of the non-oriented electrical steel sheet according to the present embodiment are not particularly affected. Further, even if each of Ca and Mg is contained in a range of 0.002% or less, the characteristics of the non-oriented electrical steel sheet according to the present embodiment are not particularly affected. Even if the rare earth elements (REM) are contained in a range of 0.004% or less, the characteristics of the non-oriented electrical steel sheet according to the present embodiment are not particularly affected. In the present embodiment, REM refers to a total of 17 elements including Sc, Y, and lanthanoids, and the REM content refers to the total amount of these elements.

O is also an impurity element, but even if O is contained in a range of 0.05% or less, the characteristics of the non-oriented electrical steel sheet according to the present embodiment are not affected. Since O may be incorporated in steel in an annealing step, even if O is contained in a range of 0.01% or less in the amount of a slab stage (that is, ladle value), the characteristics of the non-oriented electrical steel sheet according to the present embodiment are not particularly affected.

Furthermore, in addition to the above elements, elements such as Pb, Bi, As, B, and Se may be included as impurity elements. However, the characteristics of the non-oriented electrical steel sheet according to the present embodiment are not impaired as long as the amount of each of the elements is in a range of 0.0050% or less.

The chemical composition of the base metal of the non-oriented electrical steel sheet according to the present embodiment may be measured using Inductively Coupled Plasma—Atomic Emission Spectrometry (ICP-AES). In addition, sol. Al may be measured by ICP-AES using a filtrate obtained by heating and decomposing a sample with an acid. Furthermore, C and S may be measured by using the combustion-infrared absorption method, and N may be measured by using the inert gas fusion-thermal conductivity method.

3. Grain Size

From the viewpoint of the high-strengthening of the non-oriented electrical steel sheet, it is desirable that the grains in the steel are fine. In addition, it is preferable to make the grains coarser in order to reduce the hysteresis loss, and it is preferable to make the grains finer in order to reduce the eddy-current loss.

When the average grain size of the base metal is 40 μm or less, the hysteresis loss is significantly deteriorated, and it becomes difficult to improve the magnetic characteristics of the non-oriented electrical steel sheet. On the other hand, when the average grain size of the base metal exceeds 120 μm, not only is the strength of the steel lowered, but also the eddy-current loss is significantly deteriorated, and it becomes difficult to improve the magnetic characteristics of the non-oriented electrical steel sheet. Therefore, the average grain size of the base metal is set to more than 40 μm and 120 μm or less. The average grain size of the base metal is preferably 45 μm or more, more preferably 50 μm or more, and even more preferably 55 μm or more. The average grain size of the base metal is preferably 110 μm or less, and more preferably 100 μm or less.

In the present embodiment, the average grain size of the base metal is obtained according to JIS G 0551 (2013) "Steels—Micrographic determination of the apparent grain size". Specifically, first, a test piece is taken from a position 10 mm or more away from an end portion of the non-oriented electrical steel sheet so that a sheet thickness cross section parallel to the rolling direction becomes an observed section. Using an optical microscope having a photographing function, the observed section in which grain boundaries can be clearly observed by etching with a corrosive liquid is photographed at a magnification of 100-times. Using the obtained observation photograph, the average grain size of the observed grains is measured by the intercept method described in JIS G 0551 (2013). In the intercept method, evaluation is performed using two kinds of captured grains including the number of captured grains obtained by drawing five or more straight lines with a length of 2 mm in the rolling direction at equal intervals in a sheet thickness direction and capturing grains by a straight line of 10 mm or more in total, and the number of captured grains obtained by drawing five or more straight lines parallel to the sheet thickness direction perpendicular to the straight lines in the rolling direction at equal intervals in the rolling direction and captured grains with a straight line of (sheet thickness× 5) mm or more in total.

4. Magnetic Characteristics

In the non-oriented electrical steel sheet according to the present embodiment, excellent magnetic characteristics mean that an iron loss $W_{10/400}$ is low and a magnetic flux density $B_{50}$ is high. Specifically, excellent magnetic characteristics refer to a case where the iron loss $W_{10/400}$ is 16.0 W/kg or less and the magnetic flux density $B_{50}$ is 1.60 T or more when the sheet thickness of the non-oriented electrical steel sheet is more than 0.30 mm and 0.35 mm or less, a case where the iron loss $W_{10/400}$ is 15.0 W/kg or less and the magnetic flux density $B_{50}$ is 1.60 T or more when the sheet thickness is more than 0.25 mm and 0.30 mm or less, a case where the iron loss $W_{10/400}$ is 13.0 W/kg or less and the magnetic flux density $B_{50}$ is 1.60 T or more when the sheet thickness is more than 0.20 mm and 0.25 mm or less, and a case where the iron loss $W_{10/400}$ is 12.0 W/kg or less and the magnetic flux density $B_{50}$ is 1.59 T or more when the sheet thickness is 0.20 mm or less. Here, in the present embodiment, the above magnetic characteristics (iron loss $W_{10/400}$ and magnetic flux density $B_{50}$) are measured by the Epstein test specified in JIS C 2550-1 (2011). The iron loss $W_{10/400}$ means the iron loss generated under the condition that the maximum magnetic flux density is 1.0 T and the frequency is 400 Hz, and the magnetic flux density $B_{50}$ means the magnetic flux density in a magnetic field of 5000 A/m.

5. Mechanical Properties

In the non-oriented electrical steel sheet according to the present embodiment, having high strength means that the tensile (maximum) strength is 600 MPa or more. The non-oriented electrical steel sheet according to the present embodiment has a tensile strength of 600 MPa or more. The tensile strength is preferably 610 MPa or more. The upper limit of the tensile strength is not particularly limited, but may be 720 MPa or less. Here, the tensile strength is measured by performing the tensile test according to JIS Z 2241 (2011).

6. Insulation Coating

The non-oriented electrical steel sheet according to the present embodiment preferably has an insulation coating on the surface of the base metal. Since non-oriented electrical steel sheets are used after being laminated after a core blank is punched, by providing the insulation coating on the surface of the base metal, the eddy current between the sheets can be reduced, and it is possible to reduce the eddy-current loss as a core.

In the present embodiment, the kind of the insulation coating is not particularly limited, and a known insulation coating used as the insulation coating of the non-oriented electrical steel sheet can be used. Examples of such an insulation coating include a composite insulation coating primarily containing an inorganic substance and further containing an organic substance. Here, the composite insulation coating is, for example, an insulation coating in which at least any one of inorganic substances such as a metal salt such as a chromic acid metal salt or a phosphoric acid metal salt, colloidal silica, a Zr compound, and a Ti compound is primarily contained and fine particles of an organic resin are dispersed. In particular, from the viewpoint of reducing the environmental load during manufacturing, which has been in increasing demand in recent years, an insulation coating using a coupling agent based on a phosphoric acid metal salt, Zr, or Ti as a starting material, or an insulation coating using a carbonate or an ammonium salt of a coupling agent based on a phosphoric acid metal salt, Zr, or Ti as a starting material, is preferably used.

The adhesion amount of the insulation coating is not particularly limited, but is preferably about 200 to 1500 $mg/m^2$ per surface, and more preferably 300 to 1200 $mg/m^2$ per side. By forming the insulation coating so that the adhesion amount is within the above range, it is possible to hold excellent uniformity. In a case where the adhesion amount of the insulation coating is measured afterwards, various known measuring methods can be used. For example, a method for measuring the mass difference before and after immersion in a sodium hydroxide aqueous solution, or a fluorescent X-ray method using a calibration curve method can be appropriately used.

7. Manufacturing Method

A method for manufacturing the non-oriented electrical steel sheet according to the present embodiment is not particularly limited, but for example, the non-oriented electrical steel sheet can be manufactured by sequentially performing a hot rolling step, a hot-rolled sheet annealing step, and a pickling step, a cold rolling step, and a final annealing step on a steel ingot having the above-mentioned chemical composition. In the case of forming the insulation coating on the surface of the base metal, an insulation coating forming step is performed after the final annealing step. Hereinafter, each step will be described in detail.

<Hot Rolling Step>

A steel ingot (slab) having the above chemical composition is heated, and the heated steel ingot is hot-rolled to obtain a hot-rolled steel sheet. Here, the heating temperature of the steel ingot when subjected to the hot rolling is not particularly specified, but is preferably set to, for example, 1050 to 1250° C. The sheet thickness of the hot-rolled steel sheet after the hot rolling is not particularly specified, but is preferably set to, for example, about 1.5 to 3.0 mm in consideration of the final sheet thickness of the base metal.

<Hot-Rolled Sheet Annealing Step>

After the hot rolling, hot-rolled sheet annealing is performed as necessary for the purpose of increasing the magnetic flux density of the non-oriented electrical steel sheet. Regarding the heat treatment conditions for the hot-rolled sheet annealing, for example, in the case of continuous annealing, the hot-rolled steel sheet is annealed by holding the hot-rolled steel sheet at 700° C. to 1000° C. for 10 to 150 seconds. The heat treatment conditions are more preferably 10 to 150 seconds at 800° C. to 980° C., and even more preferably 10 to 150 seconds at 850° C. to 950° C.

In the case of box annealing, it is preferable to hold the hot-rolled steel sheet at 600° C. to 900° C. for 30 minutes to 24 hours. More preferably, soaking is performed at 650° C. to 850° C. for 1 to 20 hours. Although the magnetic characteristics are inferior to those in the case where the hot-rolled sheet annealing step is performed, the above-mentioned hot-rolled sheet annealing step may be omitted in order to reduce costs.

<Pickling Step>

After the hot-rolled sheet annealing, pickling is performed to remove a scale layer generated on the surface of the base metal. Here, pickling conditions such as the concentration of an acid used for the pickling, the concentration of an accelerator used for the pickling, and the temperature of a pickling solution are not particularly limited, and known pickling conditions may be used. In a case where the hot-rolled sheet annealing is box annealing, the pickling step is preferably performed before the hot-rolled sheet annealing from the viewpoint of descalability. In this case, it is not necessary to perform pickling after the hot-rolled sheet annealing.

<Cold Rolling Step>

After the pickling (in the case where box annealing is performed as the hot-rolled sheet annealing, after the hot-rolled sheet annealing step), cold rolling is performed. In the cold rolling, the pickled sheet from which the scale layer has been removed is rolled at a rolling reduction such that the final sheet thickness of the base metal is 0.10 to 0.35 mm.

<Final Annealing Step>

After the cold rolling, final annealing is performed. In the method for manufacturing the non-oriented electrical steel sheet according to the present embodiment, in the final annealing, a continuous annealing furnace is used. The final annealing step is an important step in order to control the average grain size of the base metal.

Here, regarding final annealing conditions, it is preferable that the soaking temperature is set to 850° C. to 1050° C., a soaking time is set to 1 to 300 seconds, the proportion of $H_2$ is set to 10 to 100 vol %, a mixed atmosphere of $H_2$ and $N_2$ (that is, $H_2+N_2=100$ vol %) is adopted, and the dew point of the atmosphere is set to 30° C. or lower.

In a case where the soaking temperature is lower than 850° C., the grain size becomes fine and the iron loss of the non-oriented electrical steel sheet deteriorates, which is not preferable. In a case where the soaking temperature exceeds 1050° C., the strength of the non-oriented electrical steel sheet becomes insufficient, and the iron loss also deteriorates, which is not preferable. The soaking temperature is more preferably 875° C. to 1025° C., and even more preferably 900° C. to 1000° C. When the soaking time is shorter than 1 second, the grains cannot be sufficiently coarsened. When the soaking time exceeds 300 seconds, the manufacturing cost may increase. The proportion of $H_2$ in the atmosphere is more preferably 15 to 90 vol %. The dew point of the atmosphere is more preferably 10° C. or lower, and even more preferably 0° C. or lower.

<Insulation Coating Forming Step>

After the final annealing, if necessary, the insulation coating forming step is performed. Here, a method for forming the insulation coating is not particularly limited, and using a treatment liquid for forming a known insulation coating as described below, the treatment liquid may be applied and dried by a known method. Examples of the known insulation coating include a composite insulation coating primarily containing an inorganic substance and further containing an organic substance. The composite insulation coating is, for example, an insulation coating in which at least any one of inorganic substances such as a metal salt such as a chromic acid metal salt or a phosphoric acid metal salt, colloidal silica, a Zr compound, and a Ti compound is primarily contained and fine particles of an organic resin are dispersed. In particular, from the viewpoint of reducing the environmental load during manufacturing, which has been in increasing demand in recent years, an insulation coating using a coupling agent based on a phosphoric acid metal salt, Zr, or Ti as a starting material, or an insulation coating using a carbonate or an ammonium salt of a coupling agent based on a phosphoric acid metal salt, Zr, or Ti as a starting material, is preferably used.

The surface of the base metal on which the insulation coating is to be formed may be subjected to an optional pretreatment such as a degreasing treatment with an alkali or the like, or a pickling treatment with hydrochloric acid, sulfuric acid, phosphoric acid, or the like before applying the treatment liquid. The treatment liquid may be applied onto the surface of the base metal while being subjected to the final annealing as it is without these pretreatments.

Examples

Hereinafter, the present invention will be described in more detail with reference to examples, but the conditions in the examples are merely examples adopted for confirming the feasibility and effect of the present invention, and the present invention is limited to the examples of the conditions. In the present invention, various conditions can be adopted as long as the object of the present invention is achieved without departing the gist of the present invention.

A slab having the composition shown in Table 1 was heated to 1150° C., hot-rolled to a finishing sheet thickness of 2.0 mm at a finishing temperature of 850° C., and coiled at 650° C. to obtain a hot-rolled steel sheet. In Test Nos. 1 to 16, 22, 23, 25 and 26 shown in Table 2, the obtained hot-rolled steel sheet was subjected to hot-rolled sheet annealing at 900° C. for 50 seconds and pickled to remove scale on the surface. In Test Nos. 17 to 21 shown in Table 2, the obtained hot-rolled steel sheet was pickled to remove scale on the surface, and subjected to hot-rolled sheet annealing in a box annealing furnace at 750° C. for 10 hours. Furthermore, in Test No. 24 shown in Table 2, hot-rolled sheet annealing was performed in a continuous annealing furnace at 1,000° C. for 50 seconds, and pickling was performed to remove scale on the surface. The obtained steel sheet was cold-rolled to obtain a cold-rolled steel sheet having a sheet thickness of 0.25 mm.

Furthermore, annealing was performed to achieve the average grain size as shown in Table 2 below while changing final annealing conditions in a mixed atmosphere of $H_2$: 30% and $N_2$: 70% with a dew point 0° C. at an annealing temperature of 850° C. to 1050° C. for a soaking time in a range of 1 to 300 seconds. Specifically, in a case where the average grain size was controlled to be large, the final annealing temperature was further raised and/or the soaking time was further lengthened. In a case where the average grain size was controlled to be small, the reverse was applied. Thereafter, an insulation coating was applied to manufacture a non-oriented electrical steel sheet, which was used as a test material.

The above-mentioned insulation coating was formed by applying an insulation coating containing aluminum phosphate and an acrylic-styrene copolymer resin emulsion having a particle size of 0.2 μm so as to have a predetermined adhesion amount and baking the resultant in the air at 350° C.

TABLE 1

| Kind of | Chemical composition (mass %, remainder: Fe and impurities) | | | | | | | | | | | | | | Formula (i)* left side |
|---|---|---|---|---|---|---|---|---|---|---|---|---|---|---|---|
| steel | C | Si | Mn | P | S | sol. Al | N | Ti | Nb | Zr | V | Cu | Ni | Sn | Sb | value |
| A | 0.0025 | 3.4 | 1.4 | 0.014 | 0.0008 | 0.21 | 0.0012 | 0.0012 | 0.0008 | 0.0007 | 0.0002 | 0.059 | 0.033 | 0.029 | (0.001) | 4.3 |
| B | 0.0026 | 3.8 | 1.0 | 0.015 | 0.0009 | 0.20 | 0.0013 | 0.0013 | 0.0008 | 0.0007 | 0.0018 | 0.060 | 0.035 | 0.029 | (0.001) | 4.5 |
| C | 0.0020 | 4.0 | 1.0 | 0.013 | 0.0008 | 0.22 | 0.0013 | 0.0012 | 0.0009 | 0.0006 | 0.0005 | 0.061 | 0.050 | 0.028 | (0.001) | 4.7 |
| D | 0.0025 | 4.4 | 1.0 | 0.012 | 0.0006 | 0.15 | 0.0015 | 0.0016 | 0.0007 | 0.0004 | 0.0001 | 0.058 | 0.049 | (0.001) | (0.001) | 5.1 |
| E | 0.0025 | 5.1 | 1.0 | 0.013 | 0.0007 | 0.15 | 0.0015 | 0.0016 | 0.0008 | 0.0004 | 0.0006 | 0.052 | 0.050 | (0.001) | (0.001) | 5.8 |
| F | 0.0024 | 4.0 | 0.6 | 0.015 | 0.0010 | 0.03 | 0.0014 | 0.0015 | 0.0007 | 0.0011 | 0.0009 | 0.007 | 0.005 | 0.030 | (0.001) | 4.3 |
| G | 0.0018 | 4.0 | 0.6 | 0.015 | 0.0012 | 0.21 | 0.0015 | 0.0015 | 0.0014 | 0.0006 | 0.0009 | 0.009 | 0.006 | 0.028 | (0.001) | 4.5 |
| H | 0.0028 | 3.7 | 0.4 | 0.013 | 0.0010 | 0.15 | 0.0017 | 0.0012 | 0.0016 | 0.0006 | 0.0001 | 0.005 | 0.005 | 0.030 | (0.001) | 4.1 |
| I | 0.0025 | 4.0 | 0.6 | 0.013 | 0.0009 | 0.30 | 0.0018 | 0.0012 | 0.0016 | 0.0005 | 0.0001 | 0.006 | 0.006 | 0.030 | (0.001) | 4.6 |
| J | 0.0021 | 4.0 | 0.6 | 0.013 | 0.0009 | 0.60 | 0.0010 | 0.0011 | 0.0014 | 0.0004 | 0.0008 | 0.005 | 0.006 | 0.030 | (0.001) | 4.9 |
| K | 0.0024 | 4.0 | 0.6 | 0.014 | 0.0048 | 0.30 | 0.0014 | 0.0010 | 0.0015 | 0.0005 | 0.0008 | 0.006 | 0.006 | 0.029 | (0.001) | 4.6 |
| L | 0.0027 | 4.2 | 0.4 | 0.012 | 0.0008 | 0.22 | 0.0015 | 0.0010 | 0.0004 | 0.0001 | 0.0006 | 0.012 | 0.080 | (0.001) | 0.030 | 4.6 |
| M | 0.0026 | 4.2 | 0.4 | 0.013 | 0.0007 | 0.22 | 0.0012 | 0.0011 | 0.0006 | 0.0005 | 0.0004 | 0.013 | 0.085 | 0.012 | 0.013 | 4.6 |
| N | 0.0023 | 4.1 | 0.6 | 0.018 | 0.0009 | 0.21 | 0.0014 | 0.0011 | 0.0006 | 0.0005 | 0.0003 | 0.013 | 0.092 | 0.022 | (0.001) | 4.6 |
| 0 | 0.0029 | 4.1 | 0.6 | 0.048 | 0.0008 | 0.22 | 0.0013 | 0.0012 | 0.0005 | 0.0005 | 0.0003 | 0.012 | 0.086 | 0.022 | (0.001) | 4.6 |
| P | 0.0022 | 3.5 | 1.1 | 0.020 | 0.0015 | 0.40 | 0.0022 | 0.0026 | 0.0008 | 0.0007 | 0.0008 | 0.015 | 0.050 | (0.001) | (0.001) | 4.5 |
| Q | 0.0040 | 4.0 | 0.6 | 0.016 | 0.0010 | 0.21 | 0.0014 | 0.0015 | 0.0014 | 0.0007 | 0.0010 | 0.009 | 0.006 | 0.028 | (0.001) | 4.5 |
| R | 0.0029 | 4.1 | 0.6 | 0.014 | 0.0010 | 0.08 | 0.0012 | 0.0013 | 0.0010 | 0.0006 | 0.0009 | 0.013 | 0.092 | 0.022 | (0.001) | 4.5 |

*Si + Al + 0.5 × Mn ≥ 4.3 . . . (i)

Parentheses indicate that they were not added intentionally and that they were below the detection limit

TABLE 2

| | | | Test results | | | |
|---|---|---|---|---|---|---|
| Test No. | Kind of steel | Average grain size (μm) | Tensile strength (MPa) | $W_{10/400}$ (W/kg) | $B_{50}$ (T) | Note |
| 1 | A | 51 | 568 | 12.5 | 1.65 | Comparative Example |
| 2 | B | 53 | 610 | 11.6 | 1.64 | Present Invention Example |
| 3 | C | 18 | 721 | 18.2 | 1.62 | Comparative Example |
| 4 | | 49 | 638 | 11.6 | 1.62 | Present Invention Example |
| 5 | | 89 | 610 | 11.0 | 1.62 | |
| 6 | | 133 | 589 | 13.1 | 1.62 | Comparative Example |
| 7 | D | 71 | 661 | 10.8 | 1.61 | Present Invention Example |
| 8 | E | Fractured during cold rolling | | | | Comparative Example |
| 9 | F | 27 | 665 | 15.3 | 1.66 | |
| 10 | G | 62 | 618 | 11.4 | 1.66 | Present Invention Example |
| 11 | H | 59 | 578 | 13.0 | 1.65 | Comparative Example |
| 12 | I | 66 | 619 | 11.3 | 1.64 | Present Invention Example |
| 13 | J | Fractured during cold rolling | | | | Comparative Example |
| 14 | K | 62 | 623 | 13.5 | 1.64 | |
| 15 | L | 58 | 644 | 11.7 | 1.65 | Present Invention Example |
| 16 | M | 59 | 642 | 11.5 | 1.65 | |
| 17 | N | 16 | 738 | 18.8 | 1.66 | Comparative Example |
| 18 | | 46 | 648 | 11.9 | 1.66 | Present Invention Example |
| 19 | | 58 | 634 | 11.5 | 1.65 | |
| 20 | | 93 | 611 | 11.0 | 1.64 | |
| 21 | | 151 | 590 | 11.5 | 1.62 | Comparative Example |
| 22 | O | Fractured during cold rolling | | | | |
| 23 | P | 35 | 619 | 14.0 | 1.62 | |
| 24 | | 39 | 610 | 13.8 | 1.63 | |
| 25 | Q | 61 | 620 | 12.2 | 1.66 | Present Invention Example |
| 26 | R | 58 | 627 | 12.1 | 1.65 | |

Underline indicates outside of the range of the invention.

For each of the obtained test materials, the average grain size of the base metal was measured according to JIS G 0551 (2013) "Steel-Particle Size Microscopic Test Method". In addition, an Epstein test piece was taken from the rolling direction and width direction of each of the test materials, and the magnetic characteristics (iron loss $W_{10/400}$ and magnetic flux density $B_{50}$) were evaluated by the Epstein test according to JIS C 2550-1 (2011). A case where the iron loss $W_{10/400}$ was 13.0 W/kg or less and the magnetic flux density $B_{50}$ was 1.60 T or more was regarded as having excellent magnetic characteristics and determined to be acceptable. A case where this condition was not satisfied was regarded as having inferior magnetic characteristics and determined as unacceptable. The acceptance condition was set because the sheet thickness of each of the test materials was more than 0.20 mm and 0.25 mm or less.

Furthermore, from each of the test materials, a JIS No. 5 tensile test piece was taken according to JIS Z 2241 (2011) so that the longitudinal direction thereof coincided with the rolling direction of the steel sheet. Then, a tensile test was conducted using the above test piece according to JIS Z 2241 (2011), and the tensile strength was measured. A test piece in which the tensile strength was 600 MPa or more was regarded as having high strength and determined to be acceptable. A test piece in which the tensile strength was less than 600 MPa was regarded as having inferior strength and determined to be unacceptable.

The results of the Epstein test and the tensile test are also shown in Table 2.

It could be seen that in Test Nos. 2, 4, 5, 7, 10, 12, 15, 16, 18 to 20, 25, and 26 in which the chemical composition of the steel sheet and the average grain size after the final annealing satisfied the requirements of the present invention, the iron loss was low, the magnetic flux density was high, and the tensile strength was as high as 600 MPa or more.

On the other hand, in Test Nos. 1, 3, 6, 8, 9, 11, 13, 14, 17, and 21 to 24 which are comparative examples, at least one of the magnetic characteristics and the tensile strength was inferior, or the toughness was significantly deteriorated, which made manufacturing difficult.

Specifically, in Test No. 1, the Si content was lower than the specified range, and the result was that the tensile strength was inferior. In addition, when Test Nos. 3 to 6 in which the chemical composition satisfied the requirements were compared to each other, the result was that in Test No. 3, the average grain size was smaller than the specified range, and thus the iron loss was inferior, while in Test No. 6, the average grain size was larger than the specified range, and the tensile strength was inferior.

In addition, in Test No. 8, the Si content exceeded the specified range, in Test No. 13, the sol. Al content exceeded the specified range, and in Test No. 22, the P content exceeded the specified range. Therefore, the toughness was deteriorated, fracture had occurred during the cold rolling, and thus the average grain size, tensile strength, and magnetic characteristics could not be measured.

In Test No. 11, Expression (i) was not satisfied, and the result was that iron loss and the tensile strength were inferior.

The result was that in Test No. 9, the sol. Al content was lower than the specified range, while in Test No. 14, the S content exceeded the specified range, and thus the iron loss was inferior. When Test Nos. 17 to 21 in which the chemical composition satisfied the requirements were compared to each other, the result was that in Test No. 17, the average grain size was smaller than the specified range, and thus the iron loss was inferior, while in Test No. 21, the average grain size was larger than the specified range, and thus the tensile strength was inferior.

In Test Nos. 23 and 24, the Si content was lower than the specified range, so that an average grain size lower than the specified range was achieved. Therefore, even though a tensile strength of 600 MPa or more could be obtained, the result was that the iron loss was inferior.

INDUSTRIAL APPLICABILITY

As described above, according to the present invention, a non-oriented electrical steel sheet having high strength and excellent magnetic characteristics can be obtained.

What is claimed is:

1. A non-oriented electrical steel sheet comprising:

a base metal containing, as a chemical composition, by mass %,

C: 0.0050% or less,

Si: more than 3.7% and 4.4% or less,

Mn: more than 0.2% and 1.5% or less, sol. Al: 0.05% to 0.45%,

P: 0.030% or less,

S: 0.0030% or less,

N: 0.0030% or less,

Zr: less than 0.0050%,

Cu: less than 0.200%,

Ni: less than 0.500%,

Sn: 0 to 0.100%,

Sb: 0 to 0.100%, one or more of:

Ti: 0.0005% to 0.0050%,

Nb: 0.0004% to 0.0050%, and

V: 0.0001% to 0.0050%, and a remainder: Fe and impurities, wherein Expression (i) is satisfied, and an average grain size of the base metal after final annealing is more than 40 μm and 120 μm or less, $$Si+sol.\ Al+0.5\times Mn\geq 4.3 \quad (i)$$

where element symbols in the expression represent amounts of respective elements in mass %, wherein an iron loss $W_{10/400}$ is 16.0 W/kg or less and a magnetic flux density $B_{50}$ is 1.60 T or more when a sheet thickness of the non-oriented electrical steel sheet is more than 0.30 mm and 0.35 mm or less, the iron loss $W_{10/400}$ is 15.0 W/kg or less and the magnetic flux density $B_{50}$ is 1.60 T or more when the sheet thickness is more than 0.25 mm and 0.30 mm or less, the iron loss $W_{10/400}$ is 13.0 W/kg or less and the magnetic flux density $B_{50}$ is 1.60 T or more when the sheet thickness is more than 0.20 mm and 0.25 mm or less, and the iron loss $W_{10/400}$ is 12.0 W/kg or less and the magnetic flux density $B_{50}$ is 1.59 T or more when the sheet thickness is 0.20 mm or less.

2. The non-oriented electrical steel sheet according to claim 1, wherein a tensile strength of the non-oriented electrical steel sheet is 600 MPa or more.

3. The non-oriented electrical steel sheet according to claim 2, wherein the chemical composition includes, by mass %, one or two of Sn: 0.005% to 0.100%, and Sb: 0.005% to 0.100%.

4. The non-oriented electrical steel sheet according to claim 2, further comprising:

an insulation coating on a surface of the base metal.

5. The non-oriented electrical steel sheet according to claim 1, wherein the chemical composition includes, by mass %, one or two of Sn: 0.005% to 0.100%, and Sb: 0.005% to 0.100%.

6. The non-oriented electrical steel sheet according to claim 5, further comprising:

an insulation coating on a surface of the base metal.

7. The non-oriented electrical steel sheet according to claim 1, further comprising:

an insulation coating on a surface of the base metal.

8. The non-oriented electrical steel sheet according to claim 1, wherein Si: more than 3.7% and 4.2% or less.

* * * * *